Aug. 27, 1957 S. MORANO 2,803,883
WELDER'S PIPE SETTING GAUGE
Filed July 9, 1953
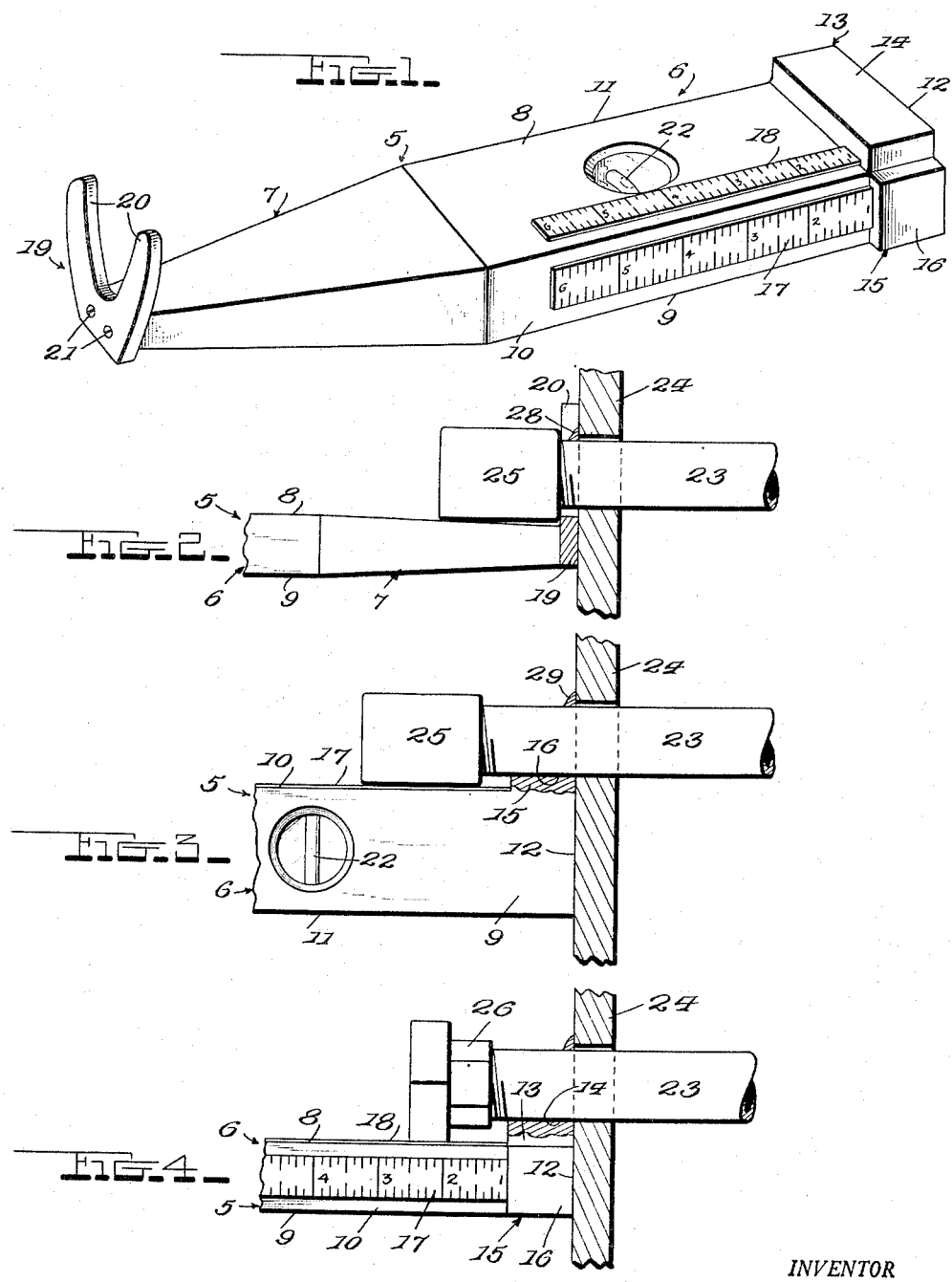
INVENTOR
S. Morano
BY
Bryant & Lowry
attys.

— 
United States Patent Office 2,803,883
Patented Aug. 27, 1957

2,803,883

WELDER'S PIPE SETTING GAUGE

Sam Morano, Morgantown, W. Va.

Application July 9, 1953, Serial No. 367,030

1 Claim. (Cl. 33—174)

Numerous pipes extend through an engine room panel board or bulkhead (hereinafter referred to only as a panel board) and are welded thereto, and each pipe has a coupling (sleeve, elbow, T or union). Each pipe should be perpendicular to the panel board and its coupling should be a specified distance from said panel board.

Heretofore, it has been quite difficult to properly position the pipes and hold them while they are being tacked with welding material preparatory to completing the welding operation. The present invention, however, is designed to provide a novel and convenient gauge to greatly facilitate the required operations.

Usually, the minimum spacing of a coupling from the panel board is about one quarter of an inch, and another object of this invention is to provide a U-shaped gauge member to straddle the pipe between the coupling and panel board to accurately determine this minimum spacing and at the same time to aid in positioning the pipe perpendicular to the board.

On some installations, specifications require that the couplings be spaced much greater distances from the panel board, and this invention further is designed to provide a novel and convenient gauge whereby such distances may be accurately measured while positioning the pipes perpendicular to the panel board.

Yet another object of this invention is to provide a gauge which may be expeditiously manufactured and therefore profitably sold at a reasonable price.

With the above and other objects in view that will become apparent as the nature of the invention is better understood, the same consists in the novel form, combination and arrangement of parts hereinafter more fully described, shown in the accompanying drawing, and claimed.

In the drawing:

Fig. 1 is a perspective view of the gauge;

Fig. 2 may be considered either as a plan view or a side elevation, partly in section, showing the manner of using the gauge to insure the proper minimum spacing between a coupling and the panel board;

Fig. 3 is a similar view showing the way of using the gauge when greater spacing is required between the coupling sleeve and the board; and Fig. 4 is a view similar to Fig. 3 but showing the manner of using the gauge to space a union a required distance from the panel board.

A preferred form of the invention has been shown in the drawing and will be rather specifically described, but attention is invited to the possibility of making variations. For example, while each measuring scale has been shown at one location convenient for reading, these scales could be disposed at any other suitable locations.

An elongated body 5 is provided having a substantially rectangular portion 6 and a tapered portion 7 united to the inner end of said portion 6. This rectangular portion 6 has two flat parallel sides 8 and 9, two flat parallel longitudinal edges 10 and 11, and a flat outer end surface 12 in a plane at right angles to all of said sides and edges 8, 9, 10, and 11.

The flat side 8 has a relatively high step 13 at its outer end, and the surface 14 of said step is parallel to said side 8 and extends to the end surface 12. Similarly, the flat edge 10 has a lower step 15, the surface 16 of which is parallel with said edge 10 and extends to the end surface 12. Both steps 13 and 15 are shown formed integrally with the body 5. The functions of these steps will be later described and also the functions of the measuring scales 17 and 18. Both of these scales may be calibrated in any desired units of measurement.

The outer extremity of the tapered portion 7 of the body 5 carries a flat U-shaped gauge plate 19 which projects laterally therefrom and is disposed in a plane at a right angle to the longitudinal axis of said body. The arms 20 of this gauge plate 19 diverge toward their free ends to straddle a pipe of one diameter or another and to contact with this pipe for a purpose to be later described.

The gauge plate 19 is shown secured by screws 21 to the body 5 but it could of course be integral with said body or otherwise secured thereto.

The rectangular portion 8 of the body 5 preferably carries a spirit tube 22 cooperable with the flat side 9 for leveling and with the flat edge 11 for plumbing.

The invention is usable to properly position any pipe 23 extending through a panel board or the like 24, before welding said pipe to said panel board, whether said pipe have a sleeve 25, a union 26, an elbow, or a T.

Fig. 2 shows the manner of using the device when the sleeve 25 is to be spaced the minimum distance of about one-quarter inch from the panel board 24. The gauge plate 19 is then inserted between the sleeve 25 and the panel board 24 snugly astride the pipe 23 and flat against said panel board. Then, by moving the pipe 23 as may be required to bring the adjacent end of the sleeve 25 truly against the gauge plate arms 20, it is known that the pipe is perpendicular to the panel board and the sleeve properly spaced from said panel board. The pipe is then tack-welded at 28 between the arms 20, the gauge is removed and the welding completed.

In Fig. 3 it is shown how the gauge is used when the sleeve 25 is to be spaced a greater specified distance from the panel board 24. The end 12 of the body 5 is held flat against the panel board 24 adjacent the pipe 23 and the pipe is slid one way or the other until the scale 17 shows that the sleeve is the required distance from the panel board. Then, by slightly moving the pipe as required to bring it against the surface 16 of step 15 and the sleeve 25 against the scale 17, it is known that the pipe is perpendicular to the panel board. The pipe is then tack-welded at 29, the gauge removed and the welding operation completed.

Fig. 4 illustrates the way of using the gauge in setting a pipe having a union 26. The step 13 and scale 18 are then employed in the same manner as just described with respect to step 15 and scale 17.

Use of the spirit tube 22 is not required in performing the above explained operations but it is readily available whenever its use is advisable.

From the foregoing it will be seen that a novel and advantageous device has been disclosed, and while there is herein shown and described the preferred embodiment of the invention, it is nevertheless to be understood that minor changes may be made therein without departing from the spirit and scope of the invention as claimed.

I claim:

A welder's pipe setting gauge comprising a body rectangular in cross-section and having flat longitudinal surfaces and a flat end surface at one end of said flat longitudinal surfaces, said flat end surface being in a plane at a right angle to said flat longitudinal surfaces and being adapted to abut a panel board through which a coupling-carrying pipe extends, said body having a step at the end of one of the flat longitudinal surfaces toward said flat end surface, said step having a flat surface in a plane parallel with said flat longitudinal surface of said body, one of said flat longitudinal surfaces, said flat step surface and said flat end surface being adapted to simultaneously abut the periphery of the pipe coupling, the pipe periphery and the panel board respectively, to properly position the pipe for welding to the panel board, and a second stepped end of the body on the adjacent flat longitudinal surface of the body and of greater height than the first named stepped portion whereby the body may be turned only through 90° to present either stepped surface for pipe gauging wherein the pipe fittings are of different diameters.

References Cited in the file of this patent

UNITED STATES PATENTS

| | | |
|---|---|---|
| 1,566,083 | Forslund | Dec. 15, 1925 |
| 1,570,558 | Durtsche | Jan. 19, 1926 |
| 1,732,906 | Morton | Oct. 22, 1929 |
| 2,214,091 | Turquand | Sept. 10, 1940 |
| 2,217,952 | Huggins | Oct. 15, 1940 |
| 2,377,020 | Lundeberg | May 29, 1945 |
| 2,493,233 | Dower | Jan. 3, 1950 |
| 2,511,496 | Darwin | June 13, 1950 |

FOREIGN PATENTS

| | | |
|---|---|---|
| 655,028 | France | Apr. 13, 1929 |